(12) United States Patent
Elangovan et al.

(10) Patent No.: US 7,724,745 B1
(45) Date of Patent: May 25, 2010

(54) METHOD AND DEVICE FOR EFFICIENT TRANSMISSION OF FLOOD DATA FRAMES IN A BACKBONE NETWORK

(75) Inventors: Anusankar Elangovan, Los Altos, CA (US); Padmanabhan Krishnan, Sunnyvale, CA (US); Giovanni Meo, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 933 days.

(21) Appl. No.: 11/372,902

(22) Filed: Mar. 9, 2006

(51) Int. Cl.
*H04L 12/28* (2006.01)
(52) U.S. Cl. .................................................. 370/392
(58) Field of Classification Search ............... 370/392
See application file for complete search history.

(56) References Cited

U.S. PATENT DOCUMENTS

| | | | |
|---|---|---|---|
| 5,394,402 A | 2/1995 | Ross | |
| 5,566,170 A * | 10/1996 | Bakke et al. | 370/392 |
| 5,742,604 A | 4/1998 | Edsall et al. | |
| 5,959,968 A | 9/1999 | Chin et al. | |
| 5,959,989 A | 9/1999 | Gleeson et al. | |
| 5,978,378 A | 11/1999 | Van Seters et al. | |
| 6,035,105 A | 3/2000 | McCloghrie et al. | |
| 6,108,702 A | 8/2000 | Wood | |
| 6,163,543 A | 12/2000 | Chin et al. | |
| 6,181,699 B1 | 1/2001 | Crinion et al. | |
| 6,188,694 B1 | 2/2001 | Fine et al. | |
| 6,208,649 B1 * | 3/2001 | Kloth | 370/392 |
| 6,219,699 B1 | 4/2001 | McCloghrie et al. | |
| 6,236,659 B1 | 5/2001 | Pascoe | |
| 6,298,061 B1 | 10/2001 | Chin et al. | |
| 6,337,861 B1 | 1/2002 | Rosen | |
| 6,446,131 B1 | 9/2002 | Khansari et al. | |
| 6,463,061 B1 | 10/2002 | Rekhter et al. | |
| 6,512,768 B1 | 1/2003 | Thomas | |
| 6,526,056 B1 | 2/2003 | Rekhter et al. | |
| 6,560,236 B1 | 5/2003 | Varghese et al. | |
| 6,618,388 B2 | 9/2003 | Yip et al. | |
| 6,741,592 B1 | 5/2004 | Edsall et al. | |
| 7,061,876 B2 | 6/2006 | Ambe | |
| 7,092,389 B2 | 8/2006 | Chase et al. | |
| 7,127,523 B2 | 10/2006 | Kotser | |
| 2003/0135644 A1 * | 7/2003 | Barrett | 709/238 |
| 2004/0090910 A1 | 5/2004 | Callon et al. | |
| 2004/0177136 A1 | 9/2004 | Chen et al. | |

(Continued)

OTHER PUBLICATIONS

Network Protocols Handbook, Javvin Technologies, 2005, p. 208.*

(Continued)

*Primary Examiner*—Pankaj Kumar
*Assistant Examiner*—Gautam Sharma
(74) *Attorney, Agent, or Firm*—Stolowitz Ford Cowger LLP (57) ABSTRACT

A method and device for efficient transmission of flood data frames in a backbone network comprising a plurality of virtual local area networks (VLANs). A flood data frame is received at an intermediate network device communicatively coupled to a backbone network, wherein the destination of the flood data frame is unknown. A customer associated with the flood data frame is identified. A customer multicast group associated with the customer is identified, the customer multicast group identifying at least one destination intermediate network device coupled to the backbone network. The flood data frame is forwarded to at least one destination intermediate network device of the customer multicast group.

21 Claims, 6 Drawing Sheets

U.S. PATENT DOCUMENTS

2005/0138149 A1  6/2005  Bhatia
2006/0159092 A1* 7/2006  Boers et al. .................. 370/390

OTHER PUBLICATIONS

Network Protocols Handbook, Javvin Technologies, 2005.*
Mick Seaman, A multiplexing tag for service instance scaling in Provider Bridged Networks, I-Tag, Service instance multiplexing, 802.1 Jul. 2004.
Muneyoshi Suzuki, et al. Addressing Issues of Provider Backbone Bridges, Nov. 2004.
Paul Bottorff, et al. Backbone Provider Bridging Networks a Highly Scalable VLAN (Multicast) Architecture, Nortel Networks, 47 pages.
Martini, et al. Encapsulation Methods for Transport of Layer 2 Frames Over IP and MPLS Networks, IEEE Internet Draft, Nov. 1, 2001.
D. Grossman, et al. RFC268-Multiprotocol Encapsulation over ATM Adaptation Layer, Network Working Group Request for Comments: 2684, Sep. 1999, pp. 1-18.
Norman Finn, Bridge-Based Ethernet Service Provision, Rev. 1.2, Cisco Systems, IEEE 802, 59 pages.
CISCO, Securing Networks with Private VLANS and VLAN Access Control Lists, 18 pages.

* cited by examiner

METHOD AND DEVICE FOR EFFICIENT TRANSMISSION OF FLOOD DATA FRAMES IN A BACKBONE NETWORK

FIELD OF INVENTION

The present invention relates to the computer networks. Specifically, the present invention relates to a method and device for efficient transmission of broadcast, unknown multicast and unknown unicast frames in a backbone network.

BACKGROUND OF THE INVENTION

Computer networks are utilized for providing collaborative environments allowing users to share and exchange information across multiple computer systems. A computer network typically includes a number of entities interconnected over a communications media. An entity may include any device, such as a computer, that transmits or receives data frames over the communications media. A common type of computer network is a local area network (LAN) which typically refers to a privately owned network within a single building or campus. LANs typically employ a data communication protocol (LAN standard), such as Ethernet, that defines the functions performed by data link and physical layers of a communications architecture (e.g., a protocol stack).

Traditionally, Ethernet has been used in enterprise LANs, while traditional interoffice connections were typically via frame relay or asynchronous transfer mode (ATM). Following a hub and spoke model, the data centers reside in one main office and all the remote branches connect in to them. This required all remote branches' communication to be routed via the hub node. As the size of LANs increased forming metropolitan area networks (MANs) and wide area networks (WANs) requiring point-to-multipoint access, it became apparent that frame relay and ATM were not able to provide that kind of multipoint layer 2 service without a complicated mesh topology.

One option that has been implemented is to use a layer 3 virtual private network (VPN) to interconnect the remote branch offices. However, layer 3 VPNs require substantial overhead. VPNs require knowledge of the customer routing topology and also an expensive edge router. Furthermore, security conscious customers do not like the idea of exposing their internal routing infrastructure to their service providers.

The Internet Engineering Task Force (IETF) drafted the virtual private LAN service (VPLS) to provide point-to-multipoint services over a Multiprotocol Label Switching (MPLS) transport network. As VPLS services mature, service providers are deploying services that could scale to previously unforeseen levels. Service providers no longer need visibility into the customer's routing topology, and customers are able to run just about any protocol they want. This is welcomed by customers who operate different protocols on their network and desire interoffice connectivity.

While VPLS provides customers with most of the functionality they need, it does not address service providers who do not have an MPLS-based core network. As a result, the use end-to-end Ethernet-based layer 2 networks have been proposed. While the Institute of the Electrical and Electronics Engineers (IEEE) 802.1ad standard addressed MAN requirements, the ongoing IEEE 802.1ah standard is what will fulfill this new requirement to replace an MPLS core network. However, it does not preclude interoperability with a VPLS network.

Layer 2 networks are also subject to address space limitations'. While IEEE 802.1ad offers more services than VPLS services, they are not able to scale much and are limited to 4095 IEEE 802.1ad service instances, e.g., virtual LANs (VLANs). MANs are widely used by service providers for providing a large number of VLANs to a large number of customers over a single provider backbone bridge network (PBBN). MAN adopts LAN technology and applies it to wide area use. Under IEEE 802.1ad, VLAN tag space is limited to 4096, limiting a service provider to 4096 VLANs. IEEE 802.1ah provides for expanding VLAN tag space in a PBBN, potentially providing millions of VLANs. Specifically, IEEE 802.1ah will specify a mechanism to encapsulate the whole customer payload data into a new Ethernet frame that carries an additional multiplexer field called the I-TAG after the provider backbone VLAN tag (B-VLAN).

Since the PBBN is Ethernet-based, flooded traffic, such as broadcast, unknown multicasts and unknown unicast, are common. The potential to detrimentally impact the performance of the PBBN increases as the number of VLANs grows beyond that supported by IEEE 802.1ad. Thus, there is a need to restrict floods in the PBBN.

Currently, there are multiple mechanisms available to restrict floods in a layer 2 network. One such mechanism is source learning based on traffic. The source MAC address and ingress port are learned in the layer 2 table and used to forward traffic in the reverse direction to the correct egress port. VLANs can also be used to constrain broadcast and flooded traffic. Although PBBN networks can be pruned based on the B-VLAN, there is no mechanism to prune the PBBN based on the B-VLAN and the I-TAG. The lack of such a pruning protocol causes traffic to reach PBBN edge nodes even if it is not required at that node.

Another mechanism for restricting floods is to leverage a network management system (NMS) to identify spurious traffic and provision the mapping of the I-TAG to a B-VLAN that runs to only the edge nodes which require that service instance. However, this requires the NMS to continuously monitor floods on the B-VLANs to make an informed decision on which service instances are causing the spurious floods or broadcasts. When supporting millions of service instances, this could become very intensive processing for the NMS system, significantly decreasing the bandwidth the PBBN as well as the processing speed of the NMS system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a method and device for efficient transmission of flood data frames in a backbone network, are described herein. In one embodiment, a flood data frame is received at an intermediate network device communicatively coupled to a backbone network, wherein the destination of the flood data frame is unknown. A customer associated with the flood data frame is identified. A customer multicast group associated with the customer is identified, the customer multicast group identifying at least one destination intermediate network device coupled to the backbone network. The flood data frame is forwarded to at least one destination intermediate network device of the customer multicast group.

In another embodiment, the present invention provides an intermediate network including a first interface, a second interface, a customer identifier, a customer multicast group identifier, and a frame forwarder. The first interface is for receiving a flood data frame, wherein the destination of the flood data frame is unknown. A second interface is for communicatively coupling the intermediate network device to a plurality of destination intermediate network devices over a backbone network. A customer identifier is for identifying a customer associated with the flood data frame. A customer multicast group identifier is for identifying a customer multicast group associated with the customer, in which the customer multicast group identifies at least one destination intermediate network device of the plurality of destination intermediate network devices. A frame forwarder is for forwarding the flood data frame to at least one destination intermediate network device of the customer multicast group.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "identifying", "forwarding", "generating", "adding", or the like, refer to the actions and processes of a computer system or similar electronic computing device, such as a bridge device (e.g., bridge device 200 of FIG. 2). The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1A:
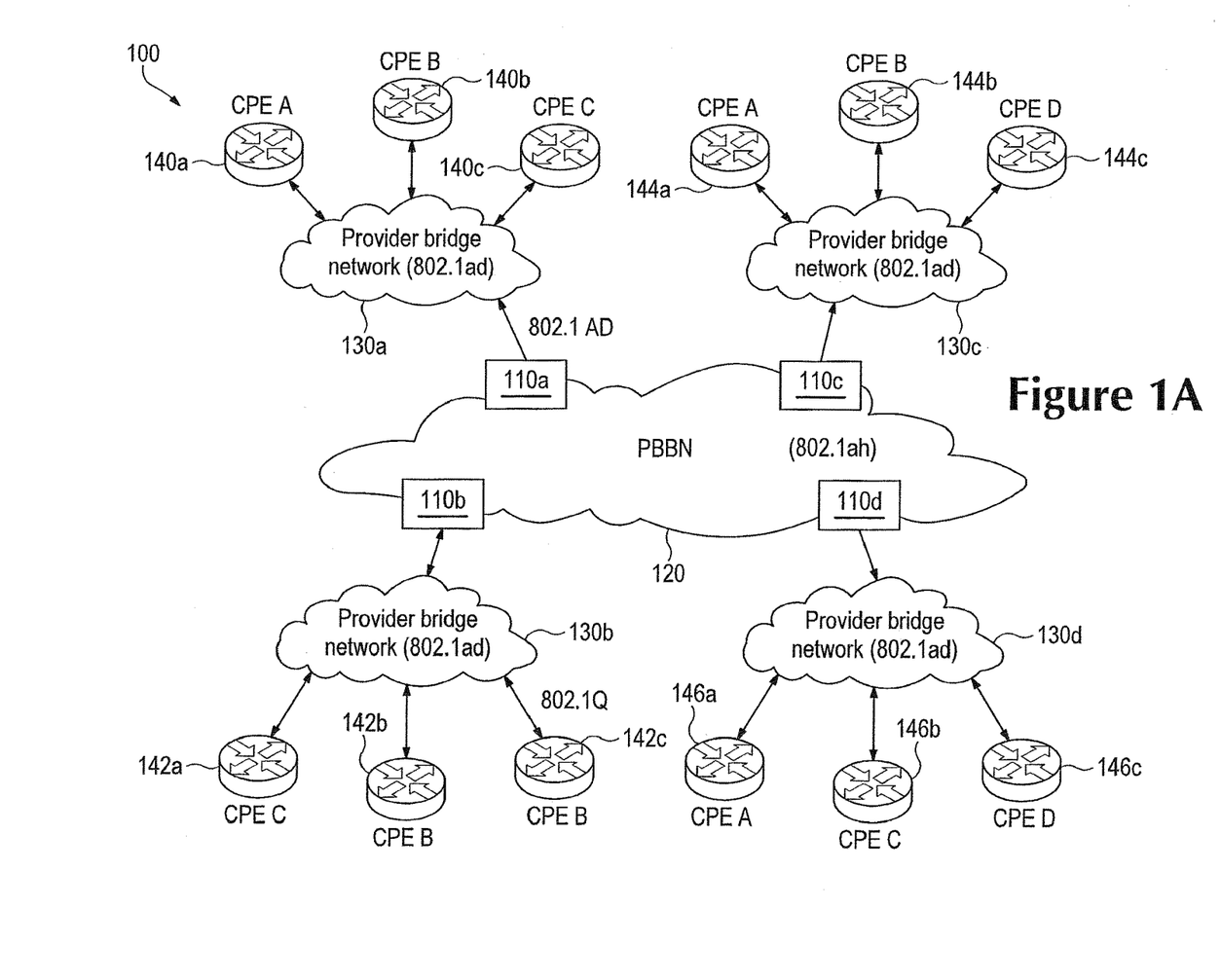
FIG. 1A is a block diagram of a network topology of a Metropolitan Area Network (MAN), upon which embodiments of the present invention may be implemented.

FIG. 1A is a block diagram of a network topology of a Metropolitan Area Network (MAN) 100, upon which embodiments of the present invention may be implemented. In one embodiment, MAN 100 is implemented using an IEEE 802.1ah provider backbone bridge network (PBBN) 120. MAN 100 includes PBBN 120, a plurality of provider backbone bridge devices 110a-d communicatively coupled to PBBN 120, a plurality of provider bridge networks (PBNs) 130a-d each coupled to a respective provider backbone bridge device 110a-d, wherein each PBN 130a-d is communicatively coupled to a plurality of customer premises equipment (CPE) devices. It should be appreciated the CPE may include any number of devices.

In one embodiment, PBNs 130a-d are IEEE 802.1ad networks. PBNs 130a-d each include at least one layer 2 intermediate network device, such as a bridge or a switch. In one embodiment, PBNs 130a-d are separate administrative domains operated by the same service provider. However, it should be appreciates that any number of PBNs may be assigned to different administrators.

CPE devices 140a-c are communicatively coupled to PBN 130a, CPE devices 142a-c are communicatively coupled to PBN 130b, CPE devices 144a-c are communicatively coupled to PBN 130c, and CPE devices 146a-c are communicatively coupled to PBN 130d. Moreover, CPE devices 140a, 144a and 146a are associated with customer A, CPE devices 140b, 142b, 142c and 144b are associated with customer B, CPE devices 140c, 142a and 146b are associated with customer C, and CPE devices 144c and 146c are associated with customer D. A customer obtains various services from MAN 100, such as interconnecting its sites that are geographically remote from each other. In this way, CPE devices located at different geographic locations can communicate.

MAN 100 is meant for illustration purposes only and is not meant to limit the invention. Indeed, MAN 100 will typically include many more customer sites, e.g., thousands.

Figure 1B:
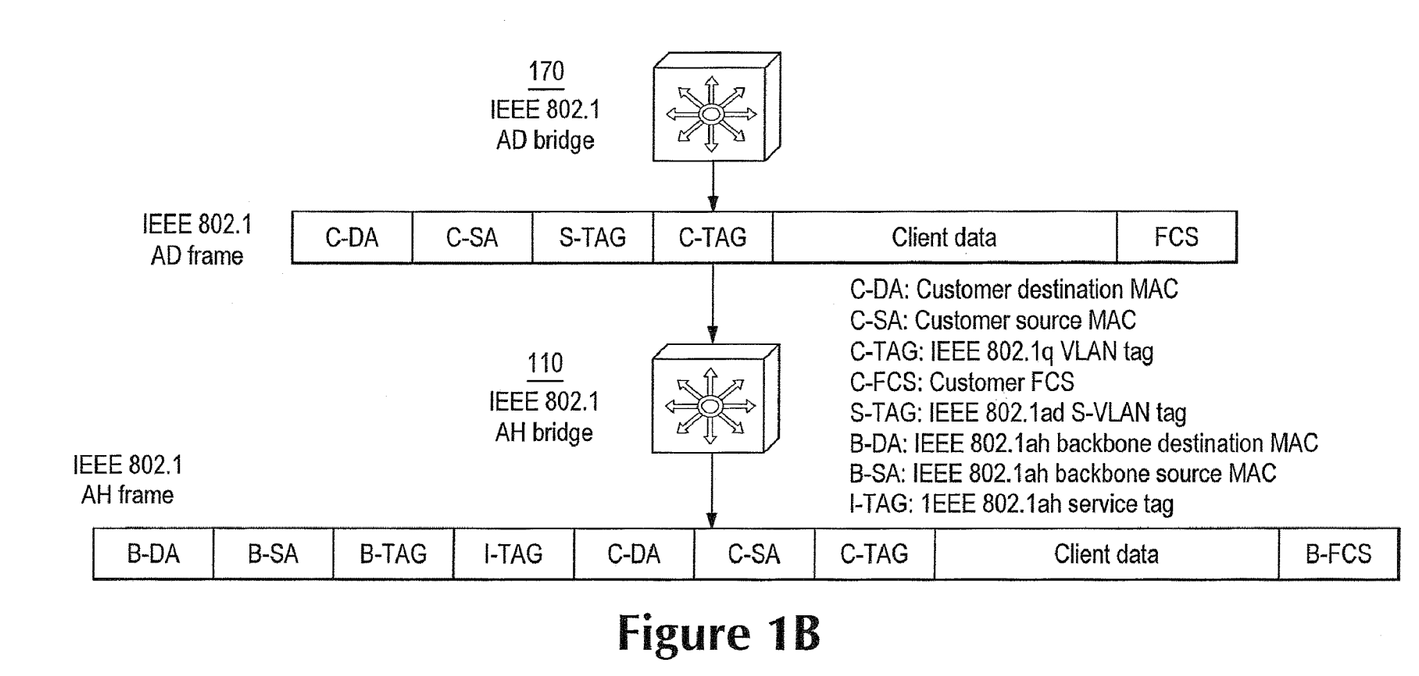
FIG. 1B is a block diagram illustrating frame transformation under different IEEE 802.1 bridge devices, in accordance with and embodiment of the present invention.

FIG. 1B is a block diagram illustrating frame transformation under different IEEE 802.1 bridge devices, in accordance with and embodiment of the present invention. Specifically, FIG. 1B illustrates the frame transformation of an IEEE 802.1ad frame to an IEEE 802.1ah frame. In one embodiment, this transformation is performed by an IEEE 802.1ah device 110 (e.g., bridge device 110a-d of FIG. 1A). The IEEE 802.1ad frame is forwarded to IEEE 802.1ah device 110 from an IEEE 802.1ad device 170. In one embodiment, IEEE 802.1ad device 170 is comprised within a PBN (e.g., PBN 130a-d of FIG. 1A).

An IEEE 802.1ad frame includes six fields:
  C-DA: the customer destination medium access control (MAC) address;

C-SA: the customer source MAC address;
S-TAG: IEEE 802.1ad S-VLAN tag;
C-TAG: IEEE 802.1q VLAN tag;
Client data: customer payload data; and
FCS: the frame-check sequence.

IEEE 802.1ah device 110 generates an IEEE 802.1ah frame. IEEE 802.1ah device 110 encapsulates the whole customer payload data of the IEEE 802.1ad frame into a new Ethernet frame that carries an additional multiplexer field called the I-TAG after the provider backbone VLAN tag (B-VLAN). This I-TAG contains a service identifier (I-SID) that is at least 20 bits, along with some more control information on the service being identified. In particular, an IEEE 802.1ah frame differs from the IEEE 802.1ad frame in that the IEEE 802.1ah also includes the following fields:

B-DA: IEEE 802.1ah backbone destination MAC address;
B-SA: IEEE 802.1ah backbone source MAC address;
B-TAG: the S-TAG for backward compatibility; and
B-FCS: the backbone frame-check sequence, replacing the FCS.

FIG. 1B illustrates the different kinds of encapsulation possible using the IEEE 802.1ah frame.

With reference to FIG. 1A, it should be appreciated that although the PBBN 120 is compliant with IEEE 802.1ah, only the provider backbone bridge devices 110a-d connecting to PBNs 130a-d need to support the IEEE 802.1ah encapsulation mechanisms. All bridge devices of PBNs 130a-d (e.g., IEEE 802.1ad bridge device 170 of FIG. 1B) can be IEEE 802.1ad bridge devices. This is because after the I-TAG encapsulation, forwarding in the PBN is done based on the outer B-VLAN and the destination MAC addresses.

In one embodiment, all traffic from the CPE devices gets encapsulated with the IEEE 802.1ad S-VLAN when they enter the PBN. Upon entry into the PBBN, the S-VLAN is removed and replaced with the corresponding I-TAG and B-VLAN. The B-VLAN can be viewed as a tunnel between the different PBBNs.

Figure 2:
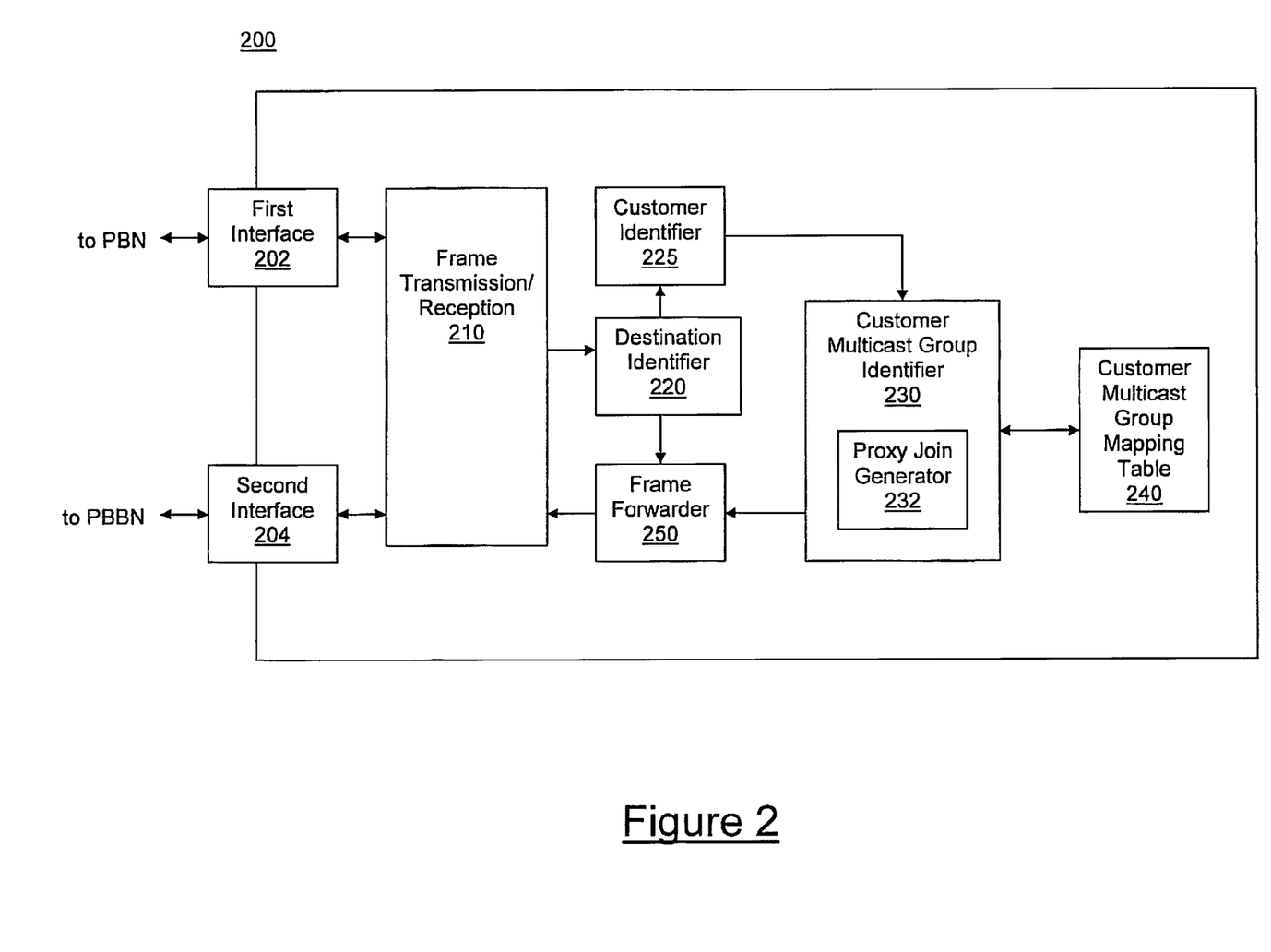
FIG. 2 is a block diagram of a bridge device, in accordance with one embodiment of the present invention.

FIG. 2 is a block diagram of an intermediate network device 200, in accordance with one embodiment of the present invention. In one embodiment, intermediate network device 200 is a backbone bridge device bridging a PBN (e.g., PBN 130a of FIG. 1A) and a PBBN (e.g., PBBN 120 of FIG. 1A). In one embodiment, intermediate network device 200 is an IEEE 802.1ah provider backbone bridge device and the PBBN is an IEEE 802.1ah PBBN.

Intermediate network device 200 is operable to restrain flooded traffic, such as broadcasts, unknown multicasts, and unknown unicasts in a customer network. In one embodiment, intermediate network device 200 performs a mapping of the flooded traffic to a unique multicast MAC address associated with the customer. The flooded traffic is forwarded only to those destination intermediate network devices that are identified under the multicast MAC address in the PBBN. In one embodiment, intermediate network device 200 is also operable to issue a proxy join for identifying destination intermediate network devices.

Intermediate network device 200 includes first interface 202, second interface 204, frame transmission/reception objects 210, destination identifier 220, customer identifier 225, customer multicast group identifier 230, customer multicast group mapping table 240, and frame forwarder 250: in one embodiment, customer multicast group identifier 230, includes proxy join generator 232. It should be appreciated that the components of intermediate network device 200 may be implemented as hardware, software or firmware, and any combination thereof. Furthermore, it should be appreciated that intermediate network device 200 may include additional components for performing different functions. These additional components are not described herein so as to not obfuscate the present invention.

First interface 202 is configured for receiving data frames from a PBN. It should be appreciated that first interface 202 may include any number of ports for receiving data from the PBN. In one embodiment, the data frames received are flood data frames having an unknown destination. It should be appreciated that flood data frames refers to any data frame having an unknown destination, such as broadcast frames, unknown multicast frames, and unknown unicast frames.

One or more frame transmission and reception objects 210 are associated with first interface 202 such that network messages, including frames, received at a given port, may be captured, and delivered to the appropriate port, for transmission. Frame reception and transmission objects 210 are preferably message storage structures, such as priority queues.

Destination identifier 220 is operable to identify the destination of an incoming frame. In one embodiment, destination identifier 220 is operable to identify whether an incoming data frame is a flood data frame. In the present embodiment, a flood data frame is a data frame wherein the destination is unknown to intermediate network device 200. In one embodiment, a data frame addressed to the broadcast MAC address of FF:FF:FF:FF:FF:FF is identified as a flood data frame. In one embodiment, if the incoming data frame is not a flood data frame, the incoming data frame is transmitted to frame forwarder 250. In the present embodiment, frame forwarder 250 directs the transmission of the incoming data frame to its ultimate destination.

A flood data frame is forwarded to customer identifier 225. Customer identifier 225 is operable to identify a customer associated with the flood data frame. In one embodiment, the customer is determined by accessing the C-SA field of the flood data frame. In one embodiment, the C-SA field is mapped to a list of known customers.

Each customer broadcast, unknown multicast or unknown unicast can be assigned to a default multicast group in the PBBN. Customer multicast group identifier 230 is operable to identify the customer multicast group associated with the customer. In one embodiment, customer multicast group identifier 230 accesses customer multicast group mapping table 240 to determine the customer multicast group for a customer. The customer multicast group indicates which intermediate network devices are associated with each customer for the purpose of forwarding flood data packets. In one embodiment, the customer multicast group identifies at least one destination intermediate network device associated with the customer. The customer multicast group includes destination intermediate devices used for accessing CPE devices associated with a particular customer, and does not include destination intermediate devices that are not in the customer network.

In one embodiment, customer multicast group identifier 230 is operable to assign a multicast group destination MAC address to the customer multicast group. In one embodiment, customer multicast groups are local to the B-VLAN and can be reused to identify another customer in a different B-VLAN. Existing protocols running in the IEEE 802.1ad backbone network are sufficient to propagate the multicast membership information throughout the PBBN, resulting in effective pruning of the customer's traffic to only the required IEEE 802.1ah provider backbone edge bridges. Without multicasting each customer's traffic, both unknown unicast and multicast would have been assigned a destination MAC address of FF:FF:FF:FF:FF:FF to be flooded to the entire PBBN. However, by assigning each customer (service instance identified by B-VLAN, I-TAG) their own multicast group, intermediate network device 200 is operable to prune unnecessary floods to other PBBN intermediate network devices.

In one embodiment, the customer multicast groups are predetermined. For example, a PBBN administrator may manually assign intermediate network devices to a particular customer multicast group.

In one embodiment, customer multicast group identifier 230 includes a proxy join generator for generating a proxy join for the customer multicast group. The proxy join notifies the destination intermediate network devices of the customer multicast group that intermediate network device 200 is hosting a multicast receiver group for the customer multicast group. In one embodiment, customer multicast group identifier 230 is operable to add a destination intermediate network device of the PBBN to the multicast receiver group in response to receiving a multicast join from the destination intermediate network device. In one embodiment, proxy join generator 232 includes a Generic Attribute Registration Protocol (GARP) Multicast Registration Protocol (GMRP) of intermediate network device 200 for generating the proxy join and for forwarding the proxy join to the destination intermediate network devices of the customer multicast group.

Upon identifying the customer multicast group associated with the incoming flood data frame, customer multicast group identifier 230 directs frame forwarder 250 to forward the flood data frame to intermediate network devices of the customer multicast group. In particular, the flood data frame is not forwarded to intermediate network devices that are not associated with the customer multicast group, thus utilizing fewer network resources in forwarding the flood data frame.

Frame forwarder 250 is operable to forward the flood data frame to at least one destination intermediate network device of the customer multicast group. In one embodiment, frame forwarder 250 is operable to encapsulate the flood data frame with the multicast group destination MAC address of the customer multicast group. In one embodiment, frame forward 250 is operable to forward the flood data frame to the multicast receiver group. Frame forwarder 250 forwards the flood data frame to intermediate network devices of the multicast customer group over the PBBN through second interface 204. Second interface 204 is communicatively coupled to a plurality of destination intermediate network devices over the PBBN.

Figure 3:
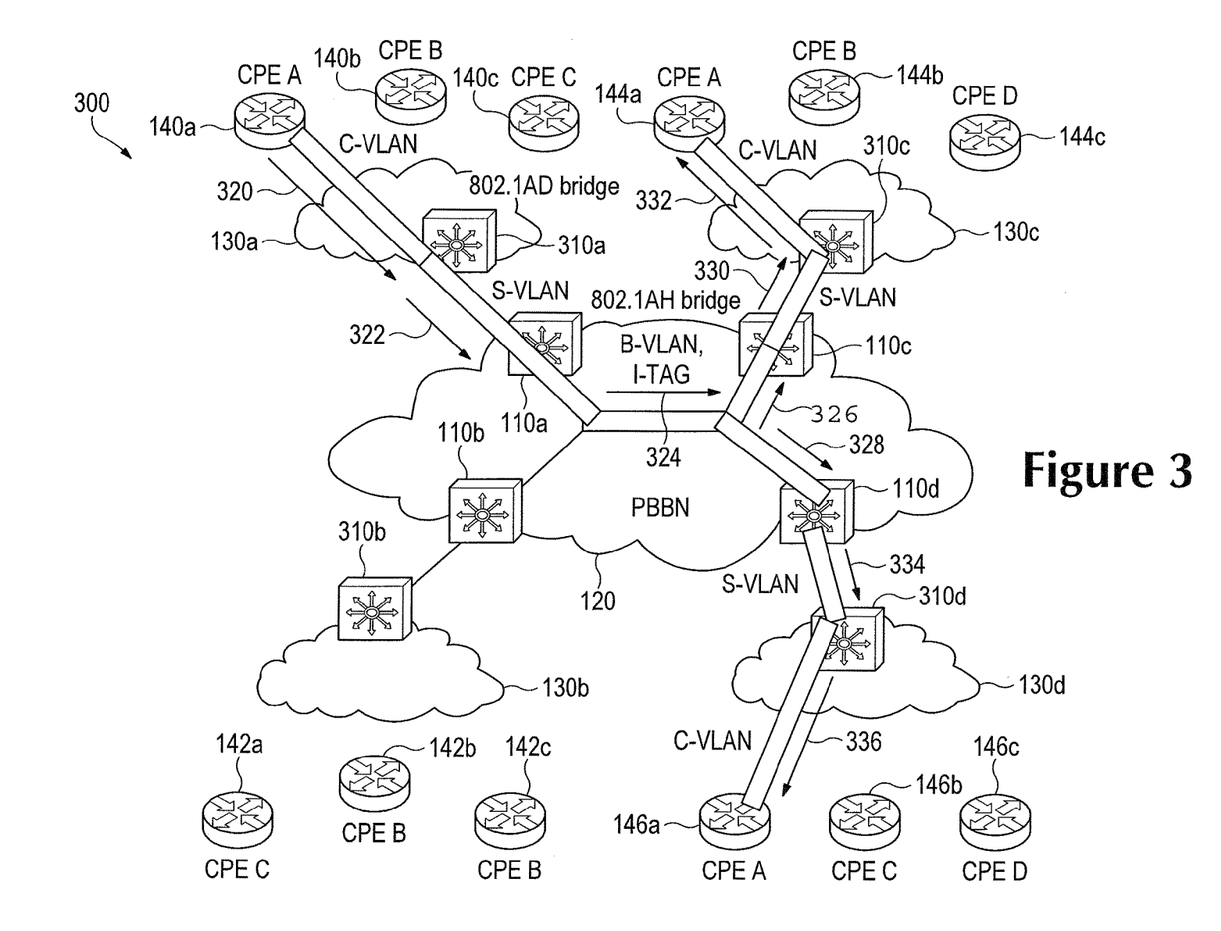
FIG. 3 is a flow diagram illustrating the flow of flooded traffic in an IEEE 802.1ah network, in accordance with one embodiment of the present invention.

FIG. 3 is a flow diagram 300 illustrating an exemplary traffic flow of flooded traffic in an IEEE 802.1ah network, specifically, MAN 100 of FIG. 1, in accordance with one embodiment of the present invention. Flow diagram 300 illustrates the flow of flooded traffic originating at CPE 140a, and associated with customer A. The frames sourced by CPE 140a are forwarded to provider backbone bridge device 110a via 802.1ad bridge device 310a, as indicated by arrows 320 and 322. The frames sourced by CPE 140a perform a forwarding table lookup on provider backbone bridge device 110a.

The forwarding table of provider backbone bridge device 110a (e.g., customer multicast group mapping table 240 of FIG. 2) indicates that provider backbone bridge devices 110c and 110d are members of the default customer multicast group for customer A. In particular, provider backbone bridge device 110a is operable to forward frames to provider backbone bridge device 110c, as indicated by arrows 324 and 326. Provider backbone bridge device 110c is operable to forward frames to 802.1 ad bridge device 310c, as indicated by arrow 330. 802.1ad bridge device 310c then forwards the frames to CPE 144a, as indicated by arrow 332, which is associated with customer A. Similarly, provider backbone bridge device 110a is operable to forward frames to provider backbone bridge device 110d, as indicated by arrows 324 and 328. Provider backbone bridge device 110d is operable to forward frames to 802.1ad bridge device 310d, as indicated by arrow 334. 802.1ad bridge device 310d then forwards the frames to CPE 146a, as indicated by arrow 336, which is associated with customer A. In particular, provider backbone bridge device 110a does not forward frames to provider backbone bridge device 110b, since provider backbone bridge device 110b is not communicatively coupled to any CPE device associated with customer A.

In one embodiment, assuming the frames are flood data frames, thus having an unknown destination, provider backbone bridge device 110a encapsulates the frame with a PBBN multicast group destination MAC, e.g., 01:00:00:01:00:01.

In one embodiment, provider backbone bridge devices 110a also updates its GMRP to generate proxy joins for the multicast group identified by 01:00:00:01:00:01. This proxy GMRP message is required to inform provider backbone bridge devices 110c and 110d intention of provider backbone bridge device 110a to host a multicast receiver for the group (B-VLAN, 01:00:00:01:00:01). GMRP will distribute the group information to all the corresponding provider backbone bridges. This ensures that future flood traffic from other provider backbone bridge devices for provider backbone bridge device 110a encapsulated with this multicast group MAC address are delivered to provider backbone bridge device 110a.

Figure 4:
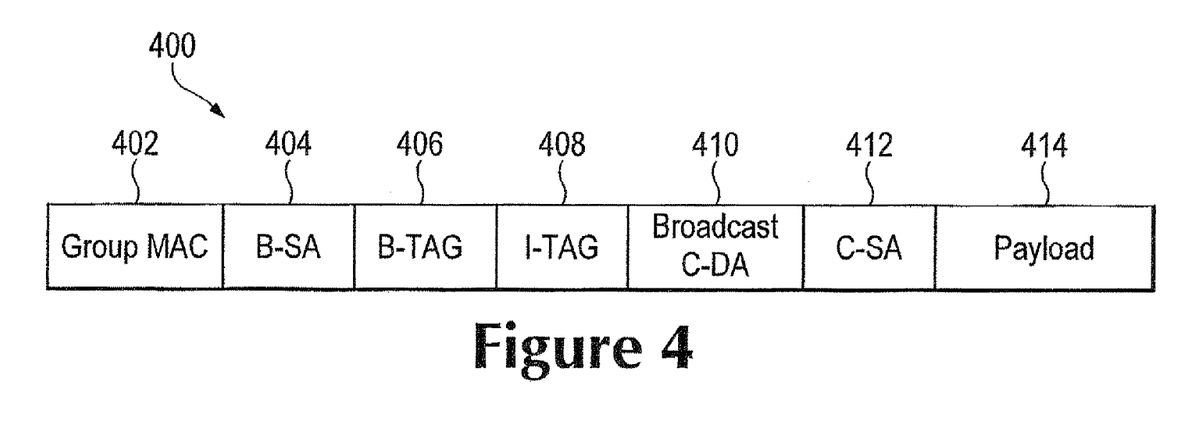
FIG. 4 illustrates a multicast IEEE 802.1ah frame for customer broadcasts, unknown multicasts and unknown unicasts, in accordance with one embodiment of the present invention.

FIG. 4 illustrates a multicast IEEE 802.1ah frame 400 for customer broadcasts, unknown multicasts and unknown unicasts, in accordance with one embodiment of the present invention. Frame 400 is in accordance with GMRP. Frame 400 includes the following fields:

Customer Multicast Group MAC address 402;
B-SA: IEEE 802.1ah backbone source MAC address 404;
B-TAG: the S-TAG for backward compatibility 406;
I-TAG: IEEE 802.1 ah multiplexer tag 408;
Broadcast C-DA: the broadcast customer destination medium access control (MAC) address 410;
C-SA: the customer source MAC address 412; and
Payload: the customer payload data 414.

Although GMRP is used as the example in this scenario, it should be appreciated that PBBN 120 could be running any multicast distribution protocol.

Figure 5:
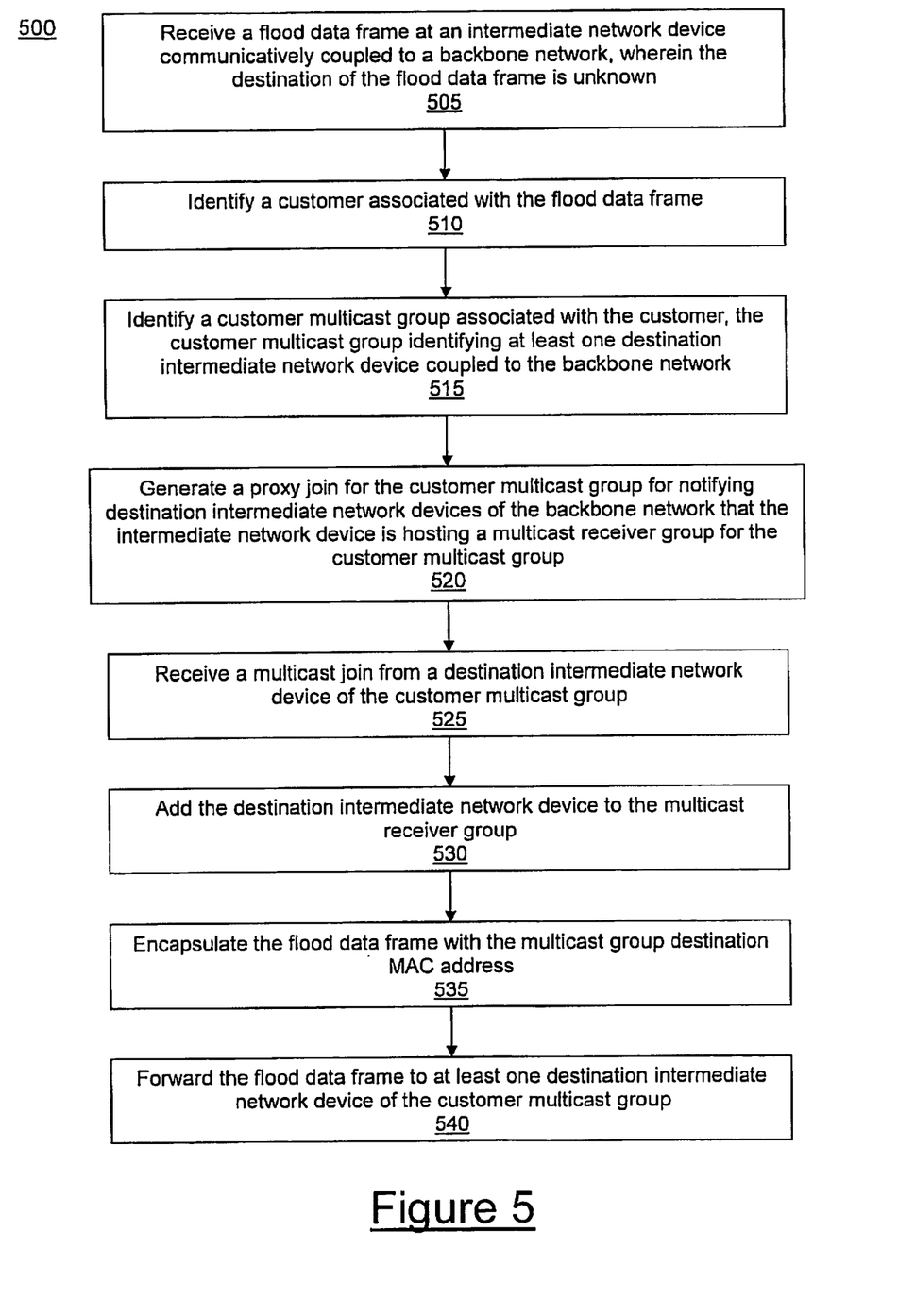
FIG. 5 is a flow chart illustrating a method for efficient transmission of flood data frames in a backbone network, in accordance with one embodiment of the present invention.

FIG. 5 is a flow chart illustrating a method 500 for efficient transmission of flood data frames in a backbone network, in accordance with one embodiment of the present invention. In one embodiment, method 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in method 500, such steps are exemplary. That is, the embodiments of the present invention are well suited to performing various other steps or variations of the steps recited in FIG. 5. In one embodiment, method 500 is performed by intermediate network device 200 of FIG. 2.

At step 505 of method 500, a flood data frame is received at an intermediate network device communicatively coupled to a backbone network, wherein the destination of the flood data frame is unknown. In one embodiment the flood data frame is one of a broadcast frame, an unknown multicast frame, and an unknown unicast frame. In one embodiment, the intermediate network device is a backbone bridge device. In one embodiment, the backbone network is an with IEEE 802.1ah provider backbone bridge network (PBBN) and wherein the backbone bridge device is a provider backbone bridge device operable in accordance with IEEE 802.1ah.

At step 510, a customer associated with the flood data frame is identified. At step 515, a customer multicast group associated with the customer is identified. The customer multicast group identifies at least One destination intermediate network device coupled to the backbone network. In one embodiment, the customer multicast group is assigned a multicast group destination medium access control (MAC) address.

In one embodiment, at step 520, a proxy join for the customer multicast group is generated for notifying destination intermediate network devices of the backbone network that the intermediate network device is hosting a multicast receiver group for the customer multicast group. At step 525, a multicast join is received from a destination intermediate network device of the customer multicast group. At step 530, the destination intermediate network device is added to the multicast receiver group. It should be appreciated that steps 520 through 530 are optional.

In one embodiment, at step 535, the flood data frame is encapsulated with the multicast group destination MAC address. At step 540, the flood data frame is forwarded to at least one destination intermediate network device of the customer multicast group. In one embodiment, the flood data frame is forwarded to a default customer multicast group. In one embodiment, the default customer multicast group includes all destination intermediate network devices used for transmitting packets to devices associated with the particular customer. In another embodiment, the flood data frame is forwarded to the multicast receiver group.

The described embodiments of the present invention provide a method and device for efficient transmission of flood data frames in a backbone network comprising a plurality of VLANS. Ethernet promises to bring the same simplicity, price, and ease of use to MANs and WANs as it did for LANs in the last decade. However, since address spaces has become an issue in the MAN/WAN core networks trying to offer millions of services, new standards like IEEE 802.1ah promise to alleviate these problems. Furthermore, the advantages of multicasting and broadcasting in a LAN may not be exactly suitable in a bandwidth cautious MAN/WAN. The embodiments of the present invention described herein offers providers a new way to avoid unnecessary traffic being flooded to remote PBBN bridges without any new control plane protocols.

Various embodiments of the present invention, a method and device for efficient transmission of flood data frames in a backbone network, are thus described. While the present invention has been described in particular embodiments, it should be appreciated that the present invention should not be construed as limited by such embodiments, but rather construed according to the below claims.

What is claimed is:

1. A method for efficient transmission of flood data frames in a backbone network comprising a plurality of virtual local area networks (VLANs), the method comprising:
   receiving a flood data frame containing a data payload at an intermediate network device communicatively coupled to to the backbone network, wherein the destination of the flood data frame is unknown;
   inspecting the flood data frame and identifying a customer associated with the flood data frame responsive to the inspection;
   identifying a customer multicast group associated with the customer, the customer multicast group identifying at least one destination intermediate network device coupled to the backbone network; and
   forwarding the flood data frame to the at least one destination intermediate network device of the customer multicast group based on the inspection.

2. The method as recited in claim 1 wherein the intermediate network device is a backbone bridge device.

3. The method as recited in claim 2 wherein the backbone network is an IEEE 802.1 ah provider backbone bridge network (PBBN) and wherein the backbone bridge device is a provider backbone bridge device operable in accordance with IEEE 802.1ah.

4. The method as recited in claim 1 wherein;
   the flood data frame is a data frame comprising a broadcast frame, an unknown multicast frame, or an unknown unicast frame, or combinations thereof;
   identifying the customer further comprises inspecting a customer source address field of the flood data frame to determine the identity of the customer; and
   identifying the customer multicast group further comprises accessing a customer multicast group mapping table to map the identified customer to the customer multicast group.

5. The method as recited in claim 4 further comprising mapping the customer source field to a list of known customers.

6. The method as recited in claim 5 further comprising encapsulating the flood data frame with a multicast group destination MAC address.

7. The method as recited in claim 1 further comprising generating a proxy join for the customer multicast group for notifying one or more destination intermediate network devices of the backbone network that the intermediate network device is hosting a multicast receiver group for the customer multicast group.

8. The method as recited in claim 7 further comprising:
   receiving a multicast join from the at least one destination intermediate network device of the customer multicast group; and
   adding the at least one destination intermediate network device to the Multicast receiver group.

9. An intermediate network device comprising:
   a first interface for receiving a flood data frame containing a data payload, wherein the destination of the flood data frame is unknown;
   a second interface for communicatively coupling the intermediate network device to a plurality of destination intermediate network devices over a backbone network;
   a customer identifier for identifying a customer associated with the flood data frame, wherein the customer is the source of the flood data frame;
   a customer multicast group identifier for identifying a customer multicast group associated with the customer, wherein the customer multicast group is predetermined and wherein the customer multicast group identifies at least one destination intermediate network device of the plurality of destination intermediate network devices; and
   a frame forwarder for forwarding the flood data frame to the at least one destination intermediate network device of the customer multicast group.

10. The intermediate network device as recited in claim 9 wherein the intermediate network device is a backbone bridge device.

11. The intermediate network device as recited in claim 10 wherein the backbone network is an IEEE 802.1ah provider backbone bridge network (PBBN) and wherein the backbone bridge device is a provider backbone bridge device configured in accordance with IEEE 802.1ah.

12. The intermediate network device as recited in claim 9 wherein the flood data frame is a data frame selected from a list consisting essentially of: a broadcast frame, an unknown multicast frame, and an unknown unicast frame.

13. The intermediate network device as recited in claim 9 wherein the customer multicast group identifier is configured to assign a multicast group destination medium access control (MAC) address to the customer multicast group.

14. The intermediate network device as recited in claim 13 wherein the frame forwarder is configured to encapsulate the flood data frame with the multicast group destination MAC address.

15. The intermediate network device as recited in claim 9 wherein the customer multicast group identifier comprises a proxy join generator for generating a proxy join for the customer multicast group for notifying the plurality of destination intermediate network devices of the customer multicast group that the intermediate network device is hosting a multicast receiver group for the customer multicast group.

16. The intermediate network device as recited in claim 15 wherein the customer multicast group identifier is configured to add the destination intermediate network device of the plurality of destination intermediate network devices to the multicast receiver group in response to receiving a multicast join from the destination intermediate network device of the customer multicast group.

17. The intermediate network device as recited in claim 16 wherein the frame forwarder is configured to forward the flood data frame to the multicast receiver group.

18. The intermediate network device as recited in claim 15 wherein the proxy join generator comprises a Generic Attribute Registration Protocol (GARP) Multicast Registration Protocol (GMRP) of the intermediate network device for generating the proxy join and for forwarding the proxy join to the destination intermediate network devices of the customer multicast group.

19. An intermediate network device comprising:
means for receiving a flood data frame, wherein the destination of the flood data frame is unknown;
means for communicatively coupling the intermediate network device to a plurality of destination intermediate network devices over a backbone network;
means for inspecting the flood data frame and identifying a customer associated with the flood data frame based on the inspection;
means for identifying a customer multicast group associated with the customer, the customer multicast group identifying at least one destination intermediate network device of the plurality of destination intermediate network devices;
means for forwarding the flood data frame to at least one destination intermediate network device of the customer multicast group.

20. The intermediate network device as recited in claim 19 wherein a customer multicast group identifier comprises a proxy join generator for generating a proxy join for the customer multicast group for notifying the destination intermediate network devices of the customer multicast group that the intermediate network device is hosting a multicast receiver group for the customer multicast group.

21. The intermediate network device as recited in claim 19 further comprising means for encapsulating the flood data frame with a multicast group destination MAC address.

\* \* \* \* \*